United States Patent [19]

Thomas et al.

[11] Patent Number: 4,511,621
[45] Date of Patent: Apr. 16, 1985

[54] REPAIR LAMINATE SHEET FOR ACRYLIC AND FIBERGLASS TUBS

[75] Inventors: Walter Thomas, St. James; Peter Lucatuorto, Islip, both of N.Y.

[73] Assignee: Lik-Nu Porcelain, Inc., Hicksville, N.Y.

[21] Appl. No.: 542,468

[22] Filed: Oct. 17, 1983

[51] Int. Cl.³ .............................................. B32B 15/00
[52] U.S. Cl. ........................................ 428/285; 4/538; 4/580; 4/581; 4/582; 4/583; 4/584; 156/94; 428/284; 428/294; 428/343; 428/354; 428/413; 428/417
[58] Field of Search ............... 428/285, 415, 417, 251; 156/94; 4/580, 581, 582, 583, 584, 538; 428/343, 354, 294, 413, 284

[56] References Cited

U.S. PATENT DOCUMENTS

| 4,043,853 | 8/1977 | Saladino | 156/94 |
| 4,126,719 | 11/1978 | Koyanagi | 428/284 |
| 4,158,585 | 6/1979 | Wright | 156/94 |

Primary Examiner—James J. Bell
Attorney, Agent, or Firm—McAulay, Fields, Fisher, Goldstein & Nissen

[57] ABSTRACT

A repair laminate sheet which can bond faults in fiberglass and acrylic tubs is provided. The repair laminate sheet includes an upper fiberglass sheet ply and a lower epoxy sheet ply. The lower epoxy ply has its upper surface adhered to the lower surface of the upper fiberglass sheet ply. Both plies are substantially the same size and shape. The lower epoxy ply is juxtaposed directly below and in registration with the upper fiberglass sheet ply. The lower surface of the lower epoxy ply is attached to the upper surface of the bottom of a fiberglass or acrylic tub so that the lower ply overlies and bonds any faults in the tub bottom.

11 Claims, 5 Drawing Figures

REPAIR LAMINATE SHEET FOR ACRYLIC AND FIBERGLASS TUBS

BACKGROUND OF THE INVENTION

The present invention relates to a repair laminate sheet and more particularly to a repair laminate sheet which can be use to bond faults in acrylic and fiberglass tubs.

Tubs in which people can bathe or shower are made of various materials. Up until about ten years ago, most of these tubs were made of porcelain or steel. In the last ten years increasing numbers of tubs have been made from fiberglass and acrylic materials. These fiberglass and acrylic tubs are preferable because they are lighter in weight then the porcelain and steel tubs. The tubs made of fiberglass and acrylic, as well as those made of porcelain and steel, tend to crack with wear. The cracks detract from the appearance of the tubs and, more importantly, if left unrepaired the cracks tend to spread and to create a substantial structural weakness in the tub.

Previously, when a tube has been badly cracked, urethane foam has been pumped into the cracks to improve the tub's appearance. However, the foam does not prevent further deterioration of the tub nor, does it strengthen the structure of the cracked tub. Further, even the cosmetic benefit created by the foam is not long lasting. Thus, when a tube was badly cracked, the only thing one could do was to remove the tub and install a new one. This is a costly and time consuming procedure which involves the use of skilled labor and which necessitates plumbing work.

Accordingly, it is an object of this invention to provide a repair laminate which bonds faults in acrylic and fiberglass tubs.

It is a further purpose of this invention to provide such a laminate which tends to prevent further deterioration of the tub and which strengthens the tub's structure.

An additional object of this invention is the provision of such a laminate which is relatively inexpensive to construct and to attach, and which does not require the use of highly skilled labor.

BRIEF DESCRIPTION

In one embodiment of the invention, a repair laminate sheet which bonds faults in fiberglass and acrylic tubs is provided. The laminate sheet includes an upper fiberglass sheet ply and a lower epoxy sheet ply. The upper surface of the epoxy ply is adhered to the lower surface of the fiberglass sheet ply. The epoxy sheet ply is substantially the same size and shape as the fiberglass sheet ply and is juxtaposed directly below and in registration with the upper fiberglass sheet ply. The lower surface of the epoxy ply can be attached to the upper surface of the bottom of both fiberglass and acrylic tubs so that the repair laminate sheet overlies and bonds any faults in the tub bottom.

As used herein the term tub shall mean a bathtub, a shower stall, or any other receptacle in which water or a similar liquid is received for bathing or similar purposes.

DESCRIPTION OF THE PREFERRED EMBODIMENTS

Figure 1:
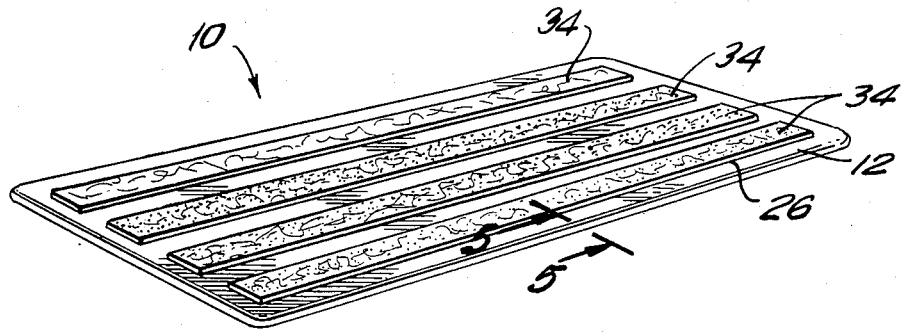
FIG. 1 is a perspective view of the repair laminate sheet of the present invention before it is attached to the tub bottom.
Figure 2:
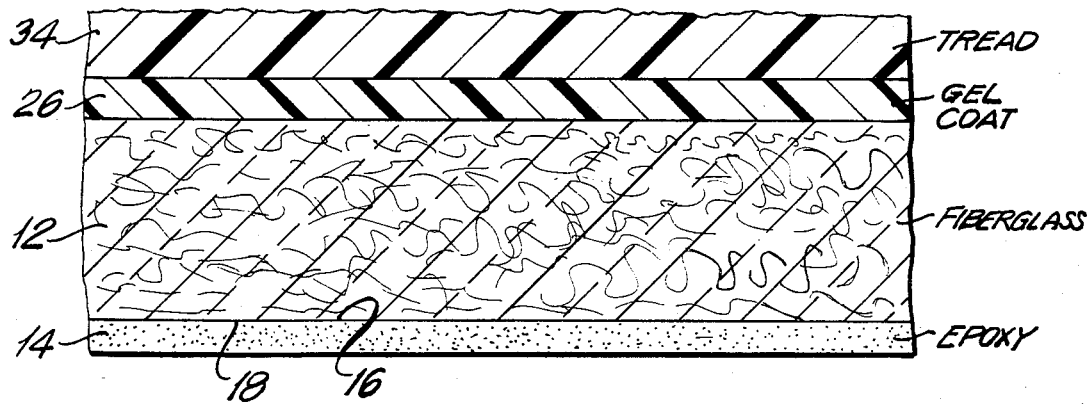
FIG. 2 is a schematic view of the FIG. 1 sheet showing the different plies. The view is not intended to show true proportional thickness of the plies.
Figure 3:
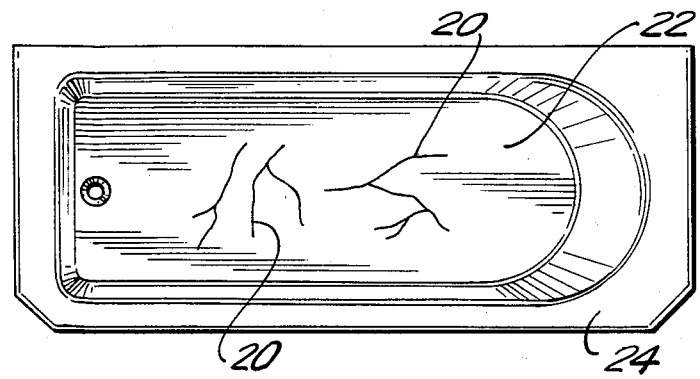
FIG. 3 is a perspective view of a tub having faults in its floor.
Figure 4:
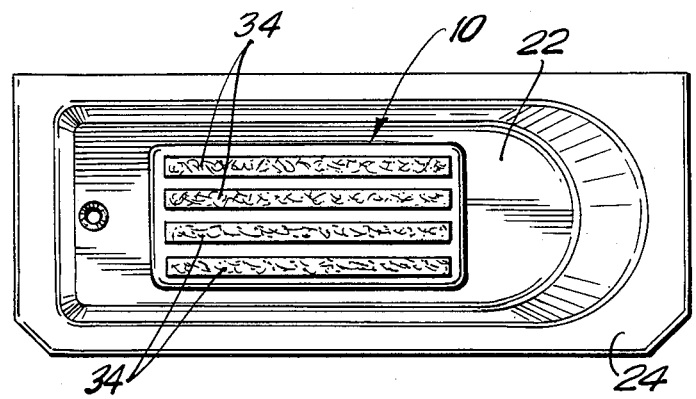
FIG. 4 is a perspective view of the FIG. 1 laminate sheet attached to the FIG. 3 tub such that it overlies and bonds the faults in the tub.
Figure 5:
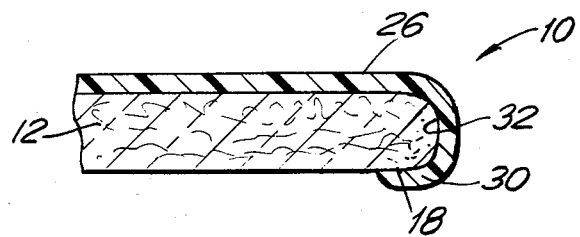
FIG. 5 is a sectional view taken substantially along line 5—5 of FIG. 1.

Referring now to the drawings the reference numeral 10 generally denotes the repair laminate sheet of the present invention. In one embodiment sheet 10 includes an upper fiberglass ply 12 and a lower epoxy ply 14. Fiberglass ply 12 and epoxy ply 14 have substantially the same size and shape. The upper surface 16 of epoxy ply 14 is adhered to the lower surface 18 of the fiberglass ply 12. Epoxy ply 14 is juxtaposed directly below and is in registration with fiberglass ply 12.

Repair laminate sheet 10 is usable to bond faults 20 in the floor 22 of fiberglass and acrylic tubs 24. Repair laminate sheet 10 is attached to the upper surface of the tub floor 22 such that it overlies and bonds the faults 20. The repair laminate sheet 10 strengthens the structure of tub 24 and prevents it from further structural deterioration.

The flexibility of repair laminate sheet 10 is what enables it to bond the faults. Sheet 10 must be flexible enough to conform to the movement of the fiberglass or acrylic substrate.

In another embodiment of the present invention the repair laminate sheet 10 includes fiberglass ply 12, epoxy ply 14 and a gel coat ply 26. Gel coat 26 is adhered to the upper surface 28 of fiberglass ply 12 and has substantially the same size and shape as fiberglass ply 12.

Fiberglass ply 12 may be formed with a peripheral lip 30 which extends around the perimeter of fiberglass ply 12. Lip 30 creates a groove 32 in the lower surface 18 of fiberglass ply 12. Groove 32 extends around the perimeter of fiberglass ply 12. Groove 32 allows the use of a thicker epoxy ply than could be otherwise used.

A plurality of non-slip strips 34 may be adhered to the upper surface of the gel coat ply 26. Strips 34 are spaced apart from one another and are textured.

In practice, each repair laminate sheet 10 is individually molded. Both the fiberglass and the gel coat are placed in the mold. When the repair laminate sheet 10 includes the non-slip strips, a mold is used which has been formed with non-slip tape to create the strips on the final molded laminate repair sheet.

When attaching the repair laminate sheet 10 to the tub floor, pressure is applied thereon using sandbags or other appropriate means. No heat is applied. The sandbags are left on the repair laminate sheet for about two hours. Although the epoxy ply 14 creates a water-tight seal between the tub and the repair laminate sheet, corking may be applied around the perimeter of the laminate to further secure the seal.

Repair laminate sheets, of different shapes and sizes, but all essentially similar to sheet 10, can be individually tailored for the particular tub to which they will be attached. The color of the sheet is also variable so that the repair laminate sheet will not detract from the tub's appearance.

Although repair laminate sheet 10 will not bond faults in either porcelain or steel tubs, due to their inflexible nature, it can enhance the appearance of these tubs if attached over the faults therein.

The fiberglass ply 12 of sheet 10 is generally between 0.16 cm to 0.635 cm thick (1/16 of an inch–1/14 of an inch). The gel coat ply and the epoxy ply are both generally thinner. Any appropriate fiberglass coat can be used for ply 26. An example of one such gel coat is Isopthalic Gel Coat available from American Colors located in Sandusky, Ohio.

What I claim is:

1. A laminate repair sheet for fiberglass or acrylic tubs, the sheet comprising:
   an upper fiberglass ply; and
   a lower epoxy ply its upper surface adhered to the lower surface of said upper fiberglass ply, said lower epoxy ply being substantially the same size and shape as said upper fiberglass ply and being juxtaposed directly below and in registration with said upper fiberglass ply, said upper fiberglass ply and said lower epoxy ply together providing sufficient flexibility to permit said sheet to conform to movement of fiberglass or acrylic tubs, the lower surface of said lower epoxy ply attached to the upper surface of the bottom of a fiberglass or acrylic tub such that said lower epoxy ply overlies and bonds any faults in said bottom.

2. A laminate repair sheet for repairing fiberglass or acrylic tubs comprising:
   an upper fiberglass ply; and
   a lower epoxy ply having its upper surface adhered to the lower surface of said upper fiberglass ply, said lower epoxy ply being substantially the same size and shape as said upper fiberglass ply and being juxtaposed directly below and in registeration with said upper fiberglass ply, said upper fiberglass ply and said lower epoxy ply together providing sufficient flexibility to permit said sheet to conform to movement of fiberglass of acrylic tubs, the lower surface of said lower epoxy ply being adapted for attachment to the upper surface of the bottom of a fiberglass or acrylic tub such that said lower epoxy ply when attached to said bottom overlies and bonds any faults therein.

3. The repair laminate sheet of claim 1 and additionally comprising a gel coat ply adhered to said upper surface of said upper fiberglass ply.

4. The repair laminate sheet of claim 1 wherein said upper fiberglass ply is formed with a thin peripheral lip portion extending completely around the perimeter of said upper fiberglass ply, said lip portion creating a narrow channel extending completely around the perimeter of the bottom of said fiberglass ply.

5. The repair laminate sheet of claim 2 and additionally comprising a gel coat ply adhered to said upper surface of said upper fiberglass ply.

6. The repair laminate sheet of claim 2 wherein said upper fiberglass ply is formed with a thin peripheral lip portion extending completely around the perimeter of said upper fiberglass ply, said lip portion creating a narrow channel extending completely around the perimeter of the bottom of said fiberglass ply.

7. The repair laminate sheet of claim 3 and additionally comprising a plurality of spaced apart, longitudinal, textured strips adhered to the top of said laminate sheet, said longitudinal strips providing a non-slip surface.

8. The repair laminate sheet of claim 5 and additionally comprising a plurality of spaced apart, longitudinal, textured strips adhered to the top of said laminate sheet, said longitudinal strips providing a non-slip surface.

9. The method of bonding faults in a fiberglass or acrylic tub comprising the steps of:
   providing a fiberglass ply;
   adhering the lower surface of said fiberglass ply to the upper surface of an epoxy ply of substantially the same size and shape as the fiberglass ply, such that the epoxy ply is juxtaposed directly below and in registration with said fiberglass ply to thus form a repair laminate sheet having sufficient flexibility to conform to movement of fiberglass or acrylic tubs; and
   attaching said repair laminate sheet to the upper surface of the bottom of a fiberglass or acrylic tub such that the lower surface of the epoxy ply overlies and bonds any faults in the tub bottom.

10. The method of claim 9 and additionally comprising the step of adhering a gel coat ply to the upper surface of said upper fiberglass ply.

11. The method of claim 10 and additionally comprising the step of adhering a plurality of spaced apart, textured, longitudinal strips, to the top of said laminate to thus provide a non-slip surface.

* * * * *